United States Patent
Kawasoe et al.

(10) Patent No.: US 9,401,765 B2
(45) Date of Patent: Jul. 26, 2016

(54) FREQUENCY OFFSET ESTIMATION CIRCUIT AND FREQUENCY OFFSET ESTIMATION METHOD

(71) Applicant: FUJITSU LIMITED, Kawasaki-shi, Kanagawa (JP)

(72) Inventors: Nobuaki Kawasoe, Yokohama (JP); Manabu Yamazaki, Fuchu (JP); Kazuhiko Hatae, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 74 days.

(21) Appl. No.: 14/512,495

(22) Filed: Oct. 13, 2014

(65) Prior Publication Data

US 2015/0147071 A1      May 28, 2015

(30) Foreign Application Priority Data

Nov. 28, 2013   (JP) ................................. 2013-245949

(51) Int. Cl.
*H04B 10/06*      (2006.01)
*H04B 10/61*      (2013.01)

(52) U.S. Cl.
CPC ........ *H04B 10/6164* (2013.01); *H04B 10/6165* (2013.01)

(58) Field of Classification Search
CPC .................. H04B 10/6164; H04B 10/6165
See application file for complete search history.

(56) References Cited

U.S. PATENT DOCUMENTS

| | | | |
|---|---|---|---|
| 2009/0142076 A1* | 6/2009 | Li | H04B 10/61 398/208 |
| 2012/0134685 A1* | 5/2012 | Ohtomo | H04B 10/611 398/208 |
| 2014/0286650 A1* | 9/2014 | Ogiwara | H04B 10/6164 398/208 |

FOREIGN PATENT DOCUMENTS

| | | |
|---|---|---|
| JP | 9-232917 | 9/1997 |
| JP | 11-55338 | 2/1999 |

\* cited by examiner

*Primary Examiner* — Dzung Tran
(74) *Attorney, Agent, or Firm* — Fujitsu Patent Center

(57) ABSTRACT

A frequency offset estimation circuit estimates a frequency offset that indicates a difference between a carrier frequency of a received optical signal and a frequency of a local oscillation light used to recover a transmission signal from the received optical signal. The frequency offset estimation circuit includes: a phase difference detector configured to detect a phase difference due to the frequency offset between a first symbol and a second symbol that is transmitted after the first symbol by a specified symbol interval based on a phase of the first symbol and a phase of the second symbol; an estimator configured to estimate the frequency offset based on the phase difference detected by the phase difference detector; and a symbol interval controller configured to specify the symbol interval based on the frequency offset estimated by the estimator.

8 Claims, 16 Drawing Sheets

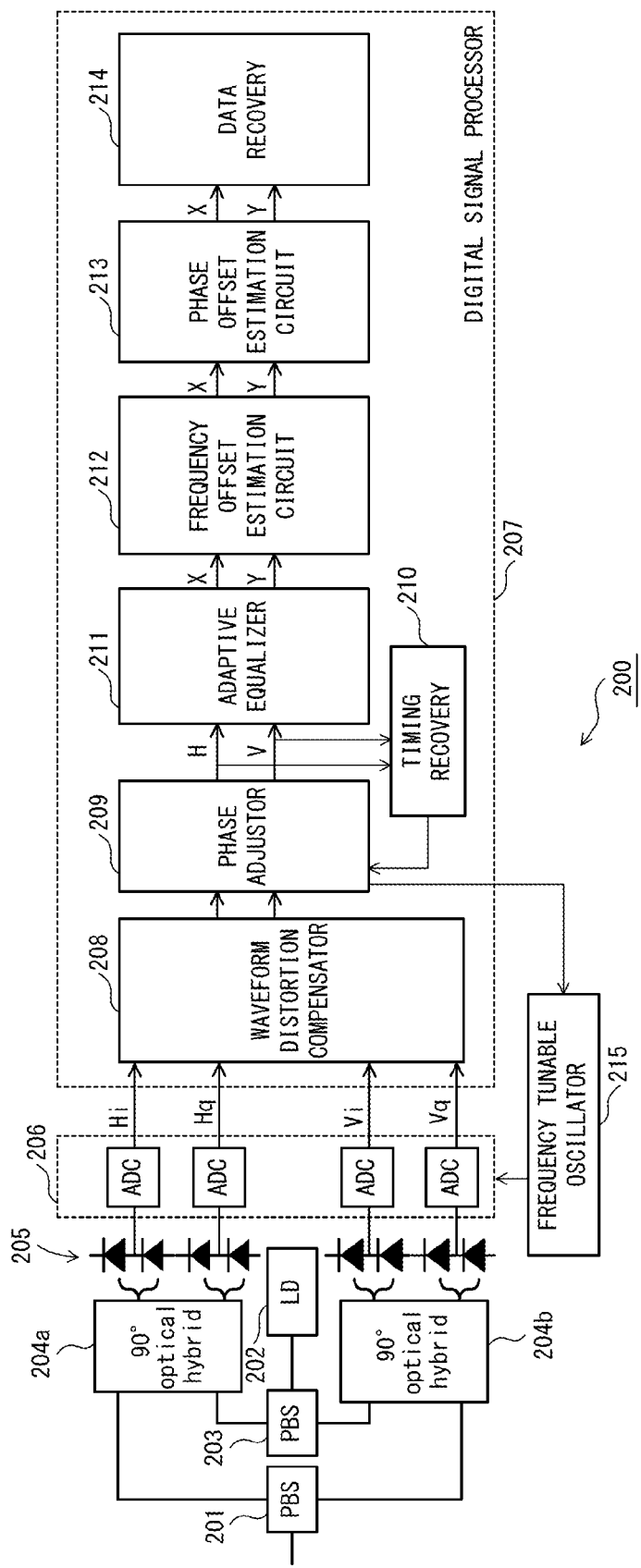
F I G. 2

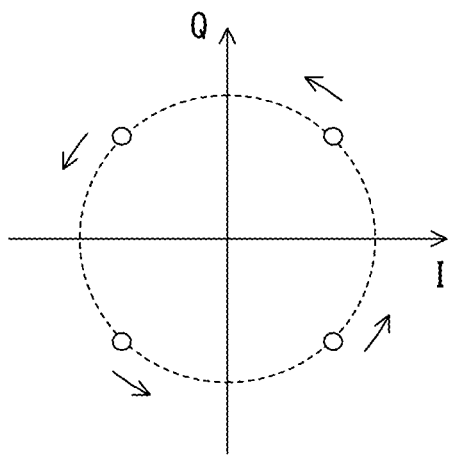
F I G. 4 A
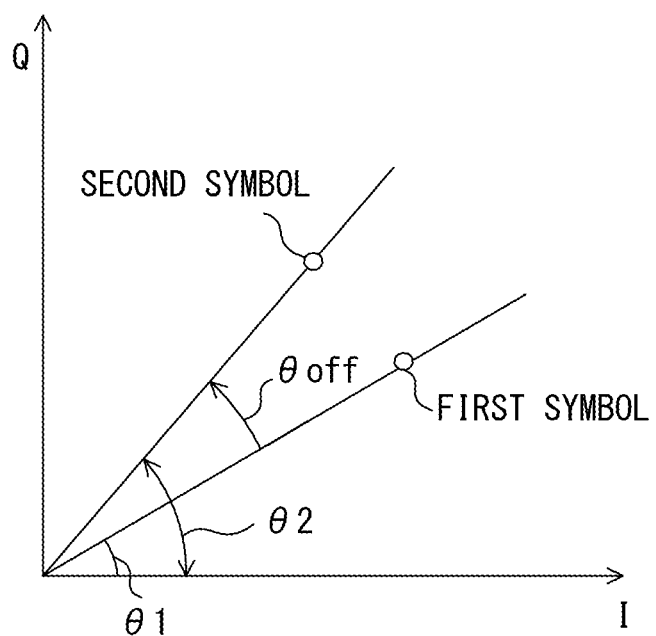
F I G. 4 B

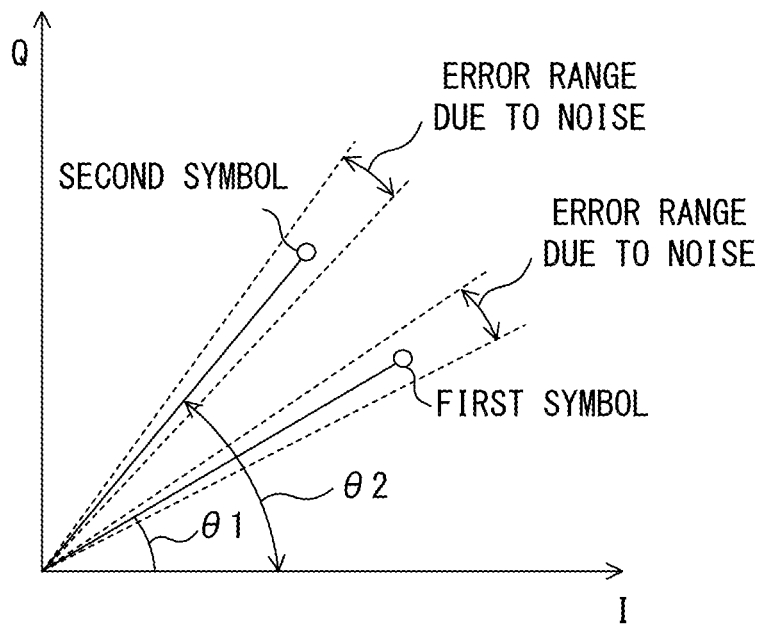
F I G. 5

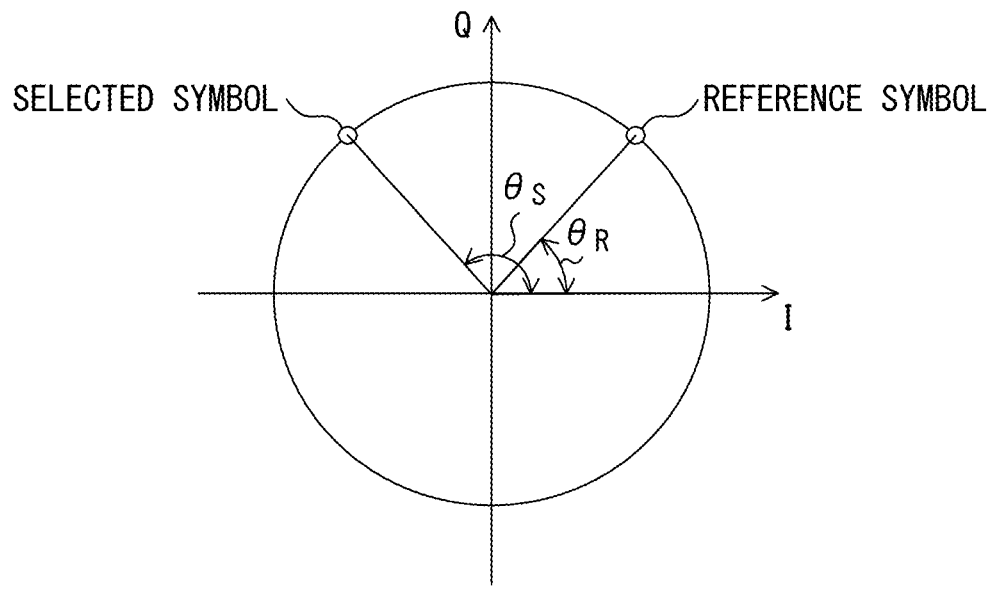
F I G. 1 4 A
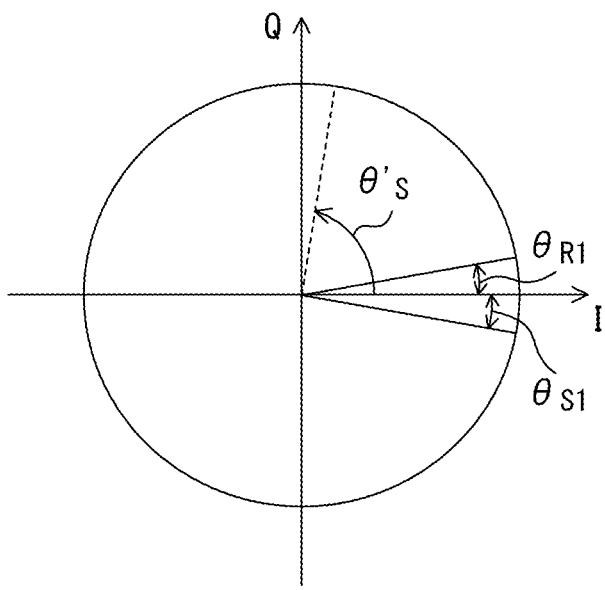
F I G. 1 4 B

F I G. 1 6 A
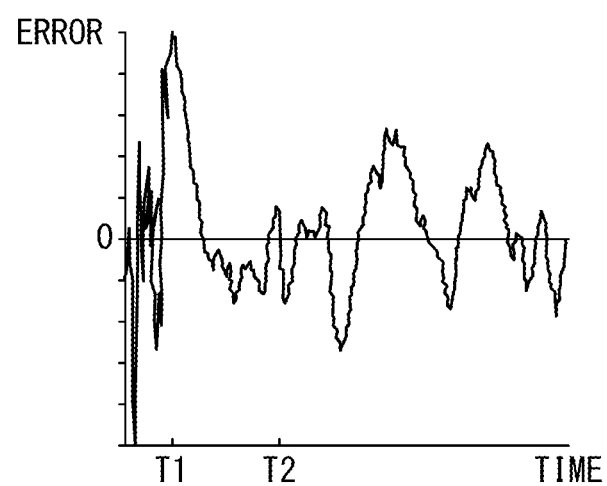
F I G. 1 6 B
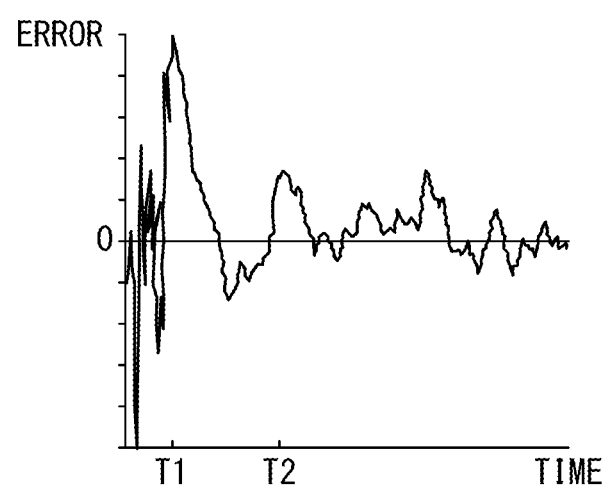
F I G. 1 6 C
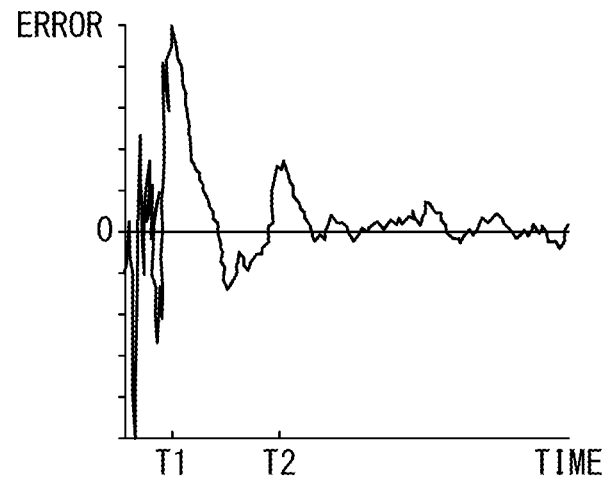

FREQUENCY OFFSET ESTIMATION CIRCUIT AND FREQUENCY OFFSET ESTIMATION METHOD

CROSS-REFERENCE TO RELATED APPLICATION

This application is based upon and claims the benefit of priority of the prior Japanese Patent Application No. 2013-245949, filed on Nov. 28, 2013, the entire contents of which are incorporated herein by reference.

FIELD

The embodiments discussed herein are related to a frequency offset estimation circuit and a frequency offset estimation method.

BACKGROUND

Optical receivers for the utilizing of digital coherent detection have recently been put into practical use. In digital coherent detection, the optical receiver recovers a transmission signal from a received optical signal by using local oscillation light. In this case, a frequency of the local oscillation light is nearly equal to a carrier frequency of an optical signal (that is, an optical frequency of a light source used in an optical transmitter). It is difficult, however, to make the carrier frequency precisely match the frequency of the local oscillation light. If the carrier frequency does not match the frequency of the local oscillation light, data cannot be recovered in the optical receiver in some cases. Thus, the optical receiver that receives an optical signal using digital coherent detection is provided with a circuit for estimating a difference between the carrier frequency and the frequency of the local oscillation light. The difference between the carrier frequency and the frequency of the local oscillation light is hereinafter referred to as "frequency offset". Further, a frequency offset estimation circuit estimates or calculates the frequency offset.

The frequency offset estimation circuit detects a phase at every received symbol, for instance. A phase of each received sign is calculated based on an I-component and a Q-component of the received signal. The frequency offset estimation circuit calculates a difference between two successive symbols and estimates a frequency offset based on the phase difference.

The frequency offset estimation circuit includes a loop filter (or an averaging circuit) for averaging frequency offsets calculated in accordance with a phase shift between the symbols. Thus, an influence of noise occurring in an optical transmission path between the optical transmitter and the optical receiver is suppressed.

Note that a wireless communication apparatus provided with a frequency compensation function for correcting a phase error that is less than the quantitative step in a phase detection circuit has been proposed (Japanese Laid-open Patent Publication No. 9-232917, for instance). Also, a digital demodulator for making a carrier frequency error sufficiently small in a synchronous detection has been proposed (Japanese Laid-open Patent Publication No. 11-55338, for instance).

A large amount of noise may be added to an optical signal in a long-distance optical transmission system. In such a case, where the noise in a received optical signal is large, a phase error of each symbol detected by the frequency offset estimation circuit becomes large. Thus, the estimation accuracy of a frequency offset is reduced.

It may be possible to solve this problem by making a coefficient of the loop filter larger, for example. That is, if the coefficient of the loop filter is large, a noise tolerance is improved. However, when the coefficient of the loop filter is large, the performance for tracking optical frequency is low. Thus, it takes long time until the frequency offset is accurately estimated.

SUMMARY

According to an aspect of the embodiments, a frequency offset estimation circuit estimates a frequency offset that indicates a difference between a carrier frequency of a received optical signal and a frequency of a local oscillation light used to recover a transmission signal from the received optical signal. The frequency offset estimation circuit includes: a phase difference detector configured to detect a phase difference due to the frequency offset between a first symbol and a second symbol that is transmitted after the first symbol by a specified symbol interval based on a phase of the first symbol and a phase of the second symbol; an estimator configured to estimate the frequency offset based on the phase difference detected by the phase difference detector; and a symbol interval controller configured to specify the symbol interval based on the frequency offset estimated by the estimator.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates an example of an optical receiver in which a frequency offset estimation circuit is used.

FIGS. 4A and 4B are diagrams to explain a frequency offset.

FIG. 5 is an explanatory diagram illustrating an influence of noise on frequency offset estimation.

FIGS. 14A and 14B are explanatory diagrams illustrating a problem in the operation example illustrated in FIG. 13.

FIGS. 16A-16C are graphs illustrating simulation results with respect to symbol intervals and estimation errors.

DESCRIPTION OF EMBODIMENTS

Figure 1:
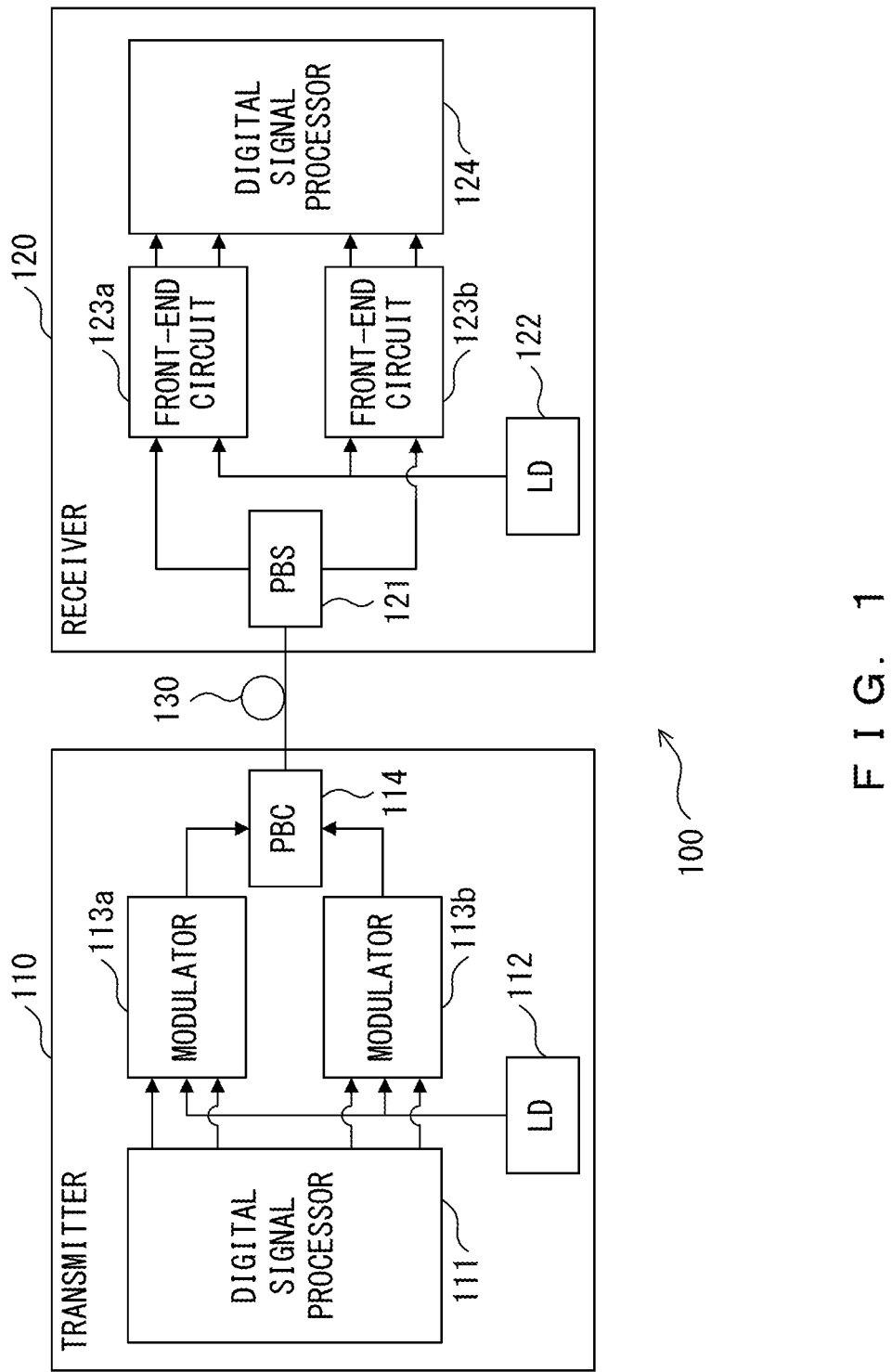
FIG. 1 illustrates an example of an optical transmission system in which a frequency offset estimation circuit is used.

FIG. 1 illustrates an example of an optical transmission system in which a frequency offset estimation circuit is used. As illustrated in FIG. 1, the optical transmission system 100 is provided with an optical transmitter 110, an optical receiver 120, and an optical fiber transmission line 130. Note that in this embodiment the optical transmission system 100 transmits a polarization multiplexed optical signal.

The optical transmitter 110 includes a digital signal processor 111, a light source 111, modulators 113a and 113b, and a polarization beam combiner (PBC) 114. The digital signal processor 111 generates a drive signal a and a drive signal b based on transmission data. The light source 112 generates continuous wave light at a specified frequency. This continuous wave light is guided to the modulators 113a and 113b. The modulator 113a modulates the continuous wave light by the drive signal a to generate a modulated optical signal and the modulator 113b modulates the continuous wave light by the drive signal b to generate a modulated optical signal. A modulation schemes of the modulators 113a and 113b may be the same or different from each other. In this embodiment, the modulation scheme of the modulators 113a and 113b is QPSK (or DPSK), for example. The polarization beam combiner 114 multiplexes the modulated optical signals generated by the modulators 113a and 113b to generate a polarization multiplexed optical signal.

The polarization multiplexed optical signal generated by the optical transmitter 110 is transmitted to the optical receiver through the optical fiber transmission line 130. A phase of the optical signal may rotate in the optical fiber transmission line 130. In addition, noise is added to the optical signal in the optical fiber transmission line 130.

The optical receiver 120 includes a polarization beam splitter (PBS) 121, a local light source 122, front-end circuits 123a and 123b, and a digital signal processor 124. The polarization beam splitter 121 splits the polarization multiplexed optical signal into a pair of polarization components (an H-polarization component and a V-polarization component). The H-polarization component and the V-polarization component are guided to the front-end circuits 123a and 123b, respectively. The local light source 122 generates local oscillation light with a frequency that is substantially the same frequency as the light source 112 in the optical transmitter 110. The local oscillation light is guided to the front-end circuits 123a and 123b. The front-end circuit 123a generates an electric signal indicating the H-polarization component by utilizing the local oscillation light. Similarly, the front-end circuit 123b generates an electric signal indicating the V-polarization component by utilizing the local oscillation light. The digital signal processor 124 recovers the transmission data from signals obtained from the front-end circuits 123a and 123b.

The optical receiver 120 has a frequency offset estimation circuit that estimates a frequency offset. The frequency offset represents a difference between a carrier signal of the optical signal transmitted from the optical transmitter 110 to the optical receiver 120 and a frequency of the local oscillation light. That is, the frequency offset corresponds to a difference between an oscillation frequency of the light source 112 and an oscillation frequency of the local light source 122. The digital signal processor 124 recovers the data from the received signal while compensating for the frequency offset. Note that the frequency offset estimation circuit is implemented by the digital signal processor 124, for instance.

FIG. 2 illustrates an example of an optical receiver in which a frequency offset estimation circuit is used. An optical receiver 200 illustrated in FIG. 2 corresponds to the optical receiver 120 in the optical transmission system 100 illustrated in FIG. 1.

The optical receiver 200 includes a polarization beam splitter 201, a local light source 202, a polarization beam splitter 203, 90-degree optical hybrid circuits 204a and 204b, a photo detector circuit 205, an A/D (Analog-to-Digital) conversion circuit 206, a digital signal processor 207, and a frequency tunable oscillator 215. In this embodiment, the optical receiver 200 receives a polarization multiplexed optical signal.

The polarization beam splitter 201 splits the polarization multiplexed optical signal into a pair of polarization components (an H-polarization component and a V-polarization component). The H-polarization component and the V-polarization component are guided to the 90-degree optical hybrid circuits 204a and 204b, respectively. The local light source 202 generates local oscillation light. A frequency of the local light source 202 is approximately equal to a carrier frequency of the received optical signal. The polarization beam splitter 203 splits the local oscillation light into a pair of polarization components and guides them to 90-degree optical hybrid circuits 204a and 204b.

The 90-degree optical hybrid circuit 204a mixes the H-polarization component and the local oscillation light to generate a pair of optical signals (an Hi-component and an Hq-component). Similarly, the 90-degree optical hybrid circuit 204b mixes the V-polarization component and the local oscillation light to generate a pair of optical signals (a Vi-component and a Vq-component). The photo detector circuit 205 converts optical signals output from the 90-degree optical hybrid circuits 204a and 204b into electric signals, respectively. The A/D conversion circuit 206 converts the signals output from the photo detector circuit 205 into digital signals, respectively. Thus, the digital signals representing the Hi-component, the Hq-component, the Vi-component and the Vq-component of the received optical signal are guided to the digital signal processor 207.

The digital signal processor 207 includes a waveform distortion compensator 208, a phase adjustor 209, a timing recovery 210, an adaptive equalizer 211, a frequency offset estimation circuit 212, a phase offset estimation circuit 213, and a data recovery 214. The waveform distortion compensator 208 compensates for waveform distortions of the optical signal occurring in the fiber optical transmission line. By way of example, the waveform distortion compensator 208 compensates for chromatic dispersion and/or polarization mode dispersion. The phase adjustor 209 and the timing recovery 210 adjust the timing for the sampling of a received signal. Note that the frequency tunable oscillator 215 adjusts a frequency and/or a phase of a clock signal used in the A/D conversion circuit 206 in accordance with a timing adjustment signal generated by the phase adjustor 209.

The adaptive equalizer 211 adaptively compensates for waveform distortions of the received signal. The adaptive equalizer 211 may also extract an X-polarization signal and a Y-polarization signal from the H-polarization component and the V-polarization component. Here, the X-polarization signal transmits data carried by one of the optical signals multiplexed in the polarization multiplexed optical signal while the Y-polarization signal transmits data carried by the other of the optical signals multiplexed in the polarization multiplexed optical signal. The H-polarization component obtained by the 90-degree optical hybrid circuit 204a includes the X-polarization signal and the Y-polarization signal. Similarly, the V-polarization component obtained by the 90-degree optical hybrid circuit 204b also includes the X-polarization signal and the Y-polarization signal. Therefore, the adaptive equalizer 211 may extract the X-polarization signal from the H-polarization component and the V-polarization component and may extract the Y-polarization signal from the H-polarization component and the V-polarization component.

The frequency offset estimation circuit 212 estimates frequency offsets of the X-polarization signal and the Y-polarization signal, respectively. The frequency offset estimation circuit 212 then compensates for the frequency offsets of the X-polarization signal and the Y-polarization signal, respectively. Note that the frequency offset estimation circuit 212 may not have a frequency offset compensation function. In this case, the digital signal processor 207 has a frequency offset compensation circuit to compensate for a frequency offset in accordance with an estimation result by the frequency offset estimation circuit 212.

The phase offset estimation circuit 213 estimates and compensates for carrier phase offsets of the X-polarization signal and the Y-polarization signal, respectively. The data recovery 214 recovers the transmission data based on phase information of the X-polarization signal and the Y-polarization signal, respectively. Note that the data recovery 214 may be provided outside of the digital signal processor 207.

Next, a frequency offset estimation circuit of an embodiment of the present invention will be explained. In the following explanation, it is assumed that a QPSK modulated optical signal is transmitted in the optical transmission system. In a polarization multiplexing optical transmission system, it is assumed that a pair of QPSK modulated optical signals are transmitted by the polarization multiplexed optical light, for instance.

Figure 3:
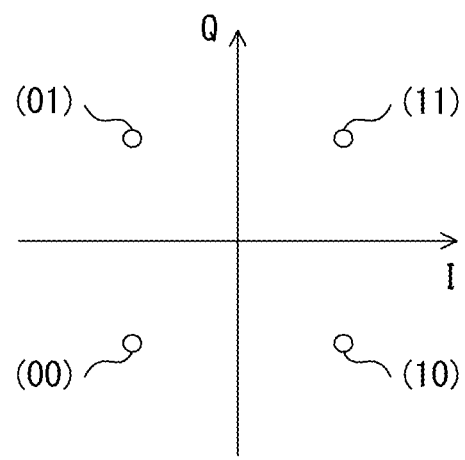
FIG. 3 illustrates an example of a QPSK constellation.

In QPSK, one symbol transmits two bits of data. Further, a phase corresponding to values of the two bits to be transmitted is allocated to each symbol. In an example illustrated in FIG. 3, "π/4" is allocated to "11", for instance. Similarly, "3π/4", "5π/4" and "7π/4" are allocated to "01", "00" and "10", respectively. Thus, the optical transmitter modulates a phase of the carrier light in accordance with the transmission data to generate the QPSK modulated optical signal. Accordingly, the optical receiver can recover the transmission data by detecting a phase of the carrier light.

When a frequency offset exists between the optical transmitter and the optical receiver, however, a phase of the carrier light detected from the received optical signal rotates as illustrated in FIG. 4A. Note that a rotation direction of the phase in the case where a carrier frequency is higher than a frequency of the local oscillation light is reverse to the rotation direction of the phase in the case where a carrier frequency is lower than a frequency of the local oscillation light.

Therefore, the optical receiver has functions that estimates a frequency offset and compensates for the frequency offset. In the optical receiver 200 illustrated in FIG. 2, these functions are implemented by the frequency offset estimation circuit 212.

FIG. 4B illustrates an example of a frequency offset estimation method. In the embodiment illustrated in FIG. 4B, the frequency offset is estimated by using two successive received symbols. In this case, a phase θ1 of the first symbol and a phase θ2 of the second symbol are detected. Here, it is assumed that a phase of the received symbol is equivalent to an argument calculated from the I-component and the Q-component of the received symbol. For ease of explanation, it is assumed that phases assigned to the first symbol and the second symbol by the optical transmitter, respectively, are equal to each other. In this case, a difference between the phase θ1 of the first symbol and the phase θ2 of the second symbol occurs as a result of a frequency offset. Thus, a frequency offset is represented by the "phase" in this specification in some cases.

An estimation value of a frequency offset is expressed by a phase change during one symbol time in the specification. Therefore, in the example illustrated in FIG. 4B, the estimation value of the frequency offset is expressed by the difference between the phase θ1 of the first symbol and the phase θ2 of the second symbol. Namely, the estimation value of the frequency offset $θ_{off}$ is expressed by the following expression.

$$θ_{off}=θ1-θ2$$

When noise added to the optical signal is large, however, an error in a phase detected with respect to each received symbol in the optical receiver becomes larger. Note that the noise added to the optical signal is large in the case where a transmission line between an optical transmitter and an optical receiver is long.

FIG. 5 is a diagram for explaining the influence of noise on a frequency offset. Here, similarly to the example illustrated in FIG. 4, it is assumed that a frequency offset is estimated by using two successive received symbols.

A phase detected from a received symbol includes an error due to noise. For this reason, a phase θ1+Δθ1 is detected from the first symbol and a phase θ2+Δθ2 is detected from the second symbol. Thus, a frequency offset $θ_{off}$ estimated from these two symbols is expressed by the following expression.

$$θ_{off}=θ1-θ2+\text{noise}$$

Hence, when the noise component is large, the estimation accuracy of the frequency offset is low and it may deteriorate the error rate in recovered data. This problem may be solved by enlarging a coefficient of a loop filter to average the frequency offset estimation value $θ_{off}$. However, if the coefficient is enlarged, the performance of tracking the optical frequency is lower. Thus, when a carrier frequency fluctuates, it takes long time until a frequency offset can be estimated with accuracy. Therefore, in order to solve the problem, a frequency offset estimation circuit in accordance with an embodiment of the present disclosure has a function to control an interval between two symbols used for the estimation of the frequency offset.

Figure 6:
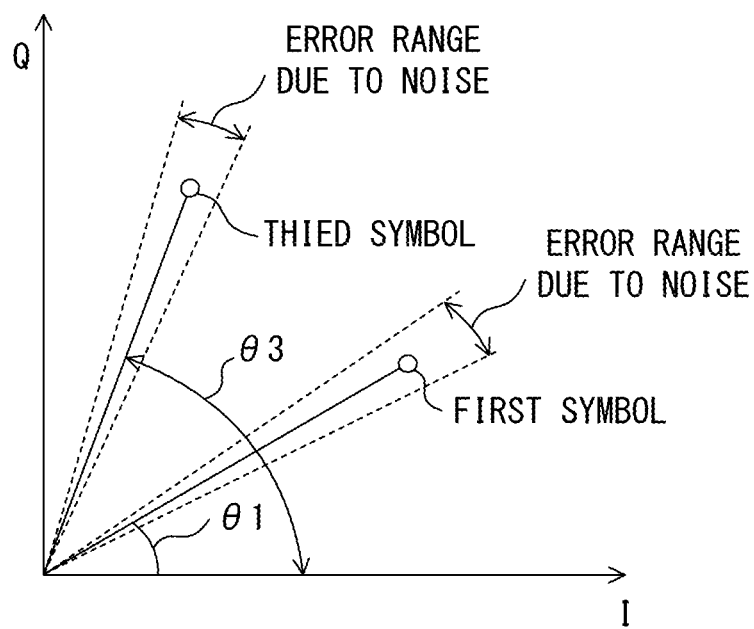
FIG. 6 illustrates a method of estimating a frequency offset at extended symbol intervals.

FIG. 6 illustrates a method of estimating a frequency offset with an extended symbol interval. Note that the symbol interval indicates an interval between two symbols used for the estimation of a frequency offset. In the specification, the interval between two successive symbols is "1". Thus, in the case where symbols 1, 2, 3, 4, . . . are sequentially transmitted in order, the symbol interval between symbols 1 and 3 is "2" while the symbol interval between symbols 1 and 4 is "3".

In the example illustrated in FIG. 6, the frequency offset is estimated by using a phase of the first symbol and a phase of the third symbol. The symbol interval between the first symbol and the third symbol is "2". That is, the symbol interval of the frequency offset estimation illustrated in FIG. 6 is double the symbol interval of the example illustrated in FIG. 5. Therefore, when the frequency offset is estimated in the example illustrated in FIG. 6, a difference between a phase of the first symbol and a phase of the third symbol is divided by "2". That is, a frequency offset $θ_{off}$ estimated from these two symbols is expressed by the following expression.

$$θ_{off}=(θ1-θ3+\text{noise})/2=(θ1-θ3)/2+\text{noise}/2$$

Here, the frequency offset is substantially constant in an ordinary operation. Thus, a change in a phase of the received symbols due to the frequency offset is in proportion to a symbol interval. That is, the phase difference θ1−θ3 is double the phase difference θ1−θ2. Therefore, (θ1−θ3)/2 is substantially equal to θ1−θ2. Further, the average of noise components is substantially not dependent on the symbol interval. That is, it may be considered that noise components in the cases of FIGS. 5 and 6 are equal to each other. Thus, the ratio of the noise component with respect to the frequency offset in the case illustrated in FIG. 6 is suppressed to ½ in comparison with the case illustrated in FIG. 5. That is, the influence of the noise on the estimation value of the frequency offset is suppressed by extending the interval between two symbols used for the estimation of a frequency offset.

However, if the interval between two symbols used for the estimation of a frequency offset is excessively large, the frequency offset is not correctly estimated in some cases. Therefore, in the frequency offset estimation method in the embodiment, the symbol interval is maximized within a range satisfying a specified condition, for example. The condition will be explained later.

Figure 7:
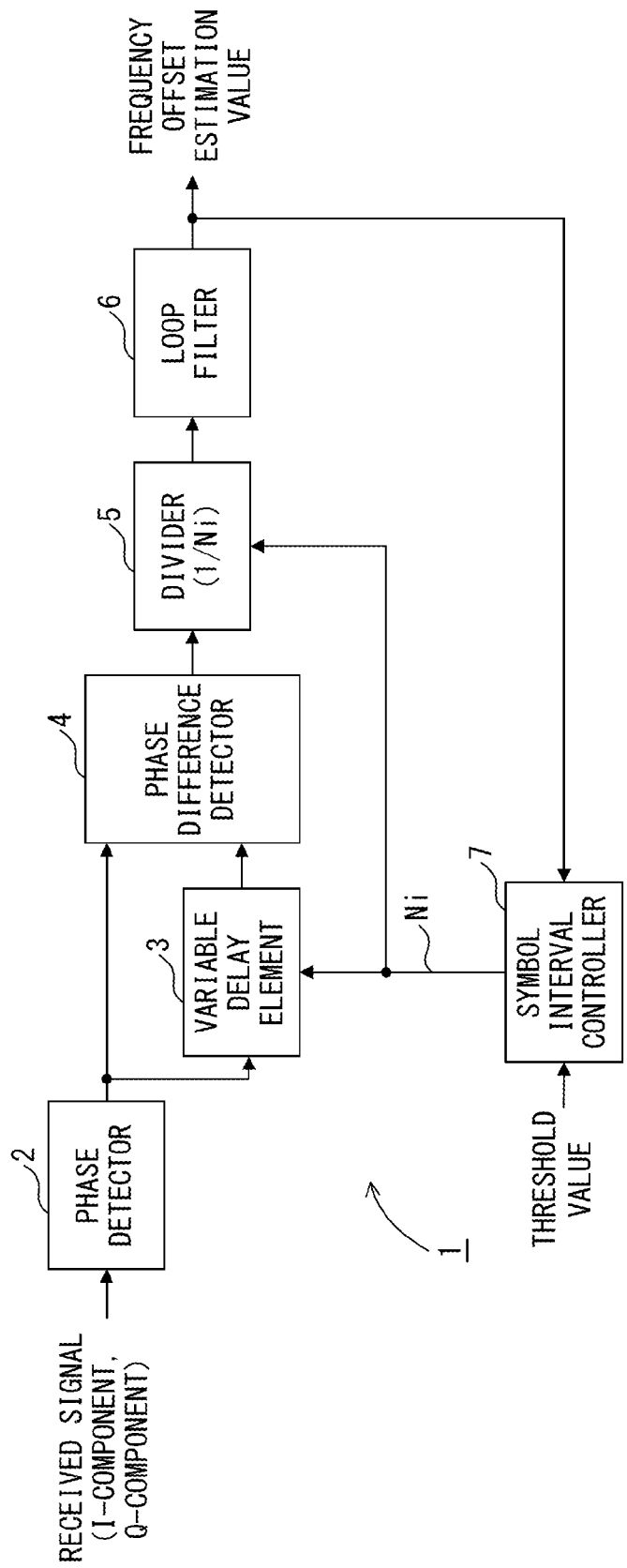
FIG. 7 is a block diagram illustrating a function of a frequency offset estimation circuit.

FIG. 7 is a block diagram that illustrates functions of the frequency offset estimation circuit in accordance with the embodiment of the present invention. The frequency offset estimation circuit 1 includes a phase detector 2, a variable delay element 3, a phase difference detector 4, a divider 5, a loop filter 6, and a symbol interval controller 7. The I-component and the Q-component are input to the frequency offset estimation circuit 1.

The phase detector 2 sequentially detects a phase of each received symbol. When symbols 1, 2, 3, ... are sequentially input to the frequency offset estimation circuit 1, the phase detector 2 outputs phase signals representing the corresponding phases $\theta 1, \theta 2, \theta 3, \ldots$ in that order. A phase of the received signal is obtained by calculating an argument based on the I-component and the Q-component of the symbol. The phase signal representing the phase detected by the phase detector 2 is fed to the variable delay element 3 and the phase difference detector 4.

The variable delay element 3 delays the phase signal representing the phase detected by the phase detector 2 in accordance with a symbol interval Ni specified by the symbol interval controller 7. For example, the variable delay element 3 delays the phase signal representing the phase detected by the phase detector 2 by the time corresponding to the symbol interval Ni.

The phase difference detector 4 detects a phase difference between two received symbols due to a frequency offset based on the phase signal supplied from the phase detector 2 and a phase signal supplied from the variable delay element 3. Here, the phase signal supplied from the variable delay element 3 is delayed by the time corresponding to the symbol interval Ni with respect to the phase signal supplied from the phase detector 2. Thus, a detection result by the phase difference detector 4 indicates a phase difference due to the frequency offset between the two symbols separated from each other by the symbol interval Ni.

The divider 5 divides a phase difference detected by the phase difference detector 4 by the symbol interval Ni. Here, a phase difference with respect to the symbol interval Ni is Ni times a phase difference occurring between two successive received symbols. Thus, an output signal of the divider 5 is equivalent to a phase difference occurring between the two successive received symbols. As explained with reference to FIGS. 5 and 6, however, a noise component in the output signal of the divider 5 is suppressed by 1/Ni in comparison with a phase difference occurring between the two successive received symbols.

The loop filter 6 performs calculations to average the output signal of the divider 5 to further suppress a residual noise. By so doing, a phase difference occurring between two received symbols with noise sufficiently suppressed is obtained. Therefore, the output signal of the loop filter 6 expresses a frequency offset estimation value. That is, the divider 5 and the loop filter 6 configure an example of an estimator for estimating a frequency offset.

The symbol interval controller 7 specifies the symbol interval Ni based on the frequency offset estimation value. At this time, the symbol interval controller 7 specifies the symbol interval Ni with reference to a threshold value corresponding to a modulation scheme of a received signal. The threshold value is $\pm\pi/4$, for example, in the case of QPSK. Note that the threshold value will be explained latter.

As an example, the symbol interval controller 7 specifies a new symbol interval in such a way that a phase parameter calculated from the frequency offset estimation value and the symbol interval Ni is maximized in a threshold value range determined in accordance with a modulation scheme of the received signal. In this case, the phase parameter is calculated by multiplying the frequency offset estimation value by the symbol interval Ni. By so doing, this phase parameter indicates a phase difference due to a frequency offset between two received symbols. That is, the symbol interval controller 7 updates the symbol interval in such a way that a phase difference due to a frequency offset between two received symbols used for the estimation of a frequency offset is maximized within the threshold value range.

The symbol interval Ni updated by the symbol interval controller 7 is fed to the variable delay element 3 and the divider 5. As stated above, the variable delay element 3 delays, by the time corresponding to the symbol interval Ni, the phase signal that indicates the phase detected by the phase detector 2. The divider 5 divides the phase difference detected by the phase difference detector 4 by the symbol interval Ni, as described above.

In this way, an interval between two received symbols used for the frequency offset estimation is maximized under a specified condition in the frequency offset estimation circuit 1. Thus, as explained with reference to FIGS. 5 and 6, the noise components added to the information indicating the phase difference between the two received symbols are suppressed. Therefore, the influence of noise added to the optical signal is sufficiently suppressed to increase the estimation accuracy of the frequency offset even if the coefficient of the loop filter 6 is not enlarged. That is to say, the noise tolerance can be improved without lowering performance of tracking the optical frequency.

Figure 8:
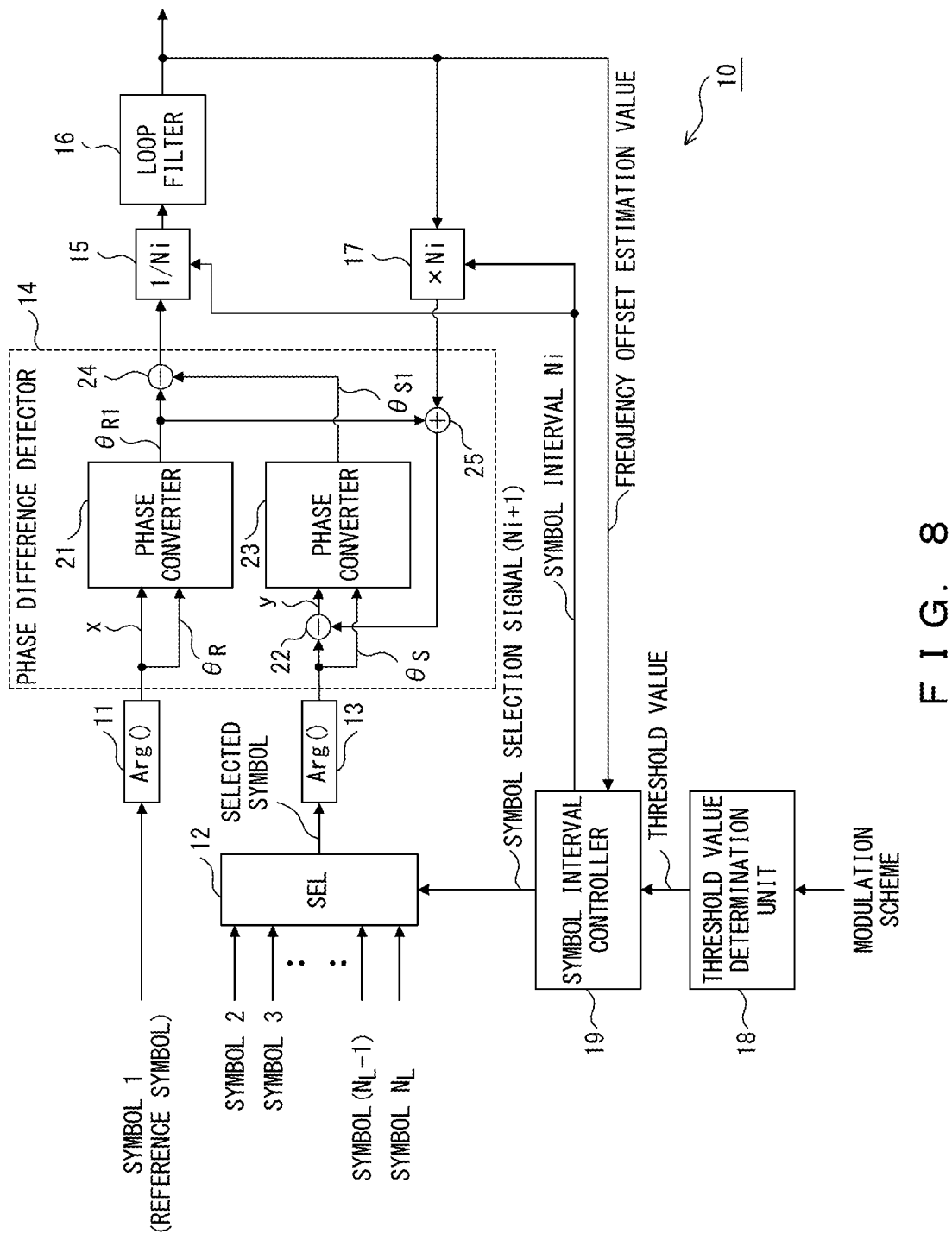
FIG. 8 illustrates an example of a frequency offset estimation circuit.

FIG. 8 illustrates an example of a frequency offset estimation circuit in accordance with an embodiment of the present disclosure. As illustrated in FIG. 8, the frequency offset estimation circuit in accordance with the embodiment includes a phase detector 11, a selector 12, a phase detector 13, a phase difference detector 14, a divider 15, a loop filter 16, a multiplier 17, a threshold value determination unit 18, and a symbol interval controller 19.

Figure 9:
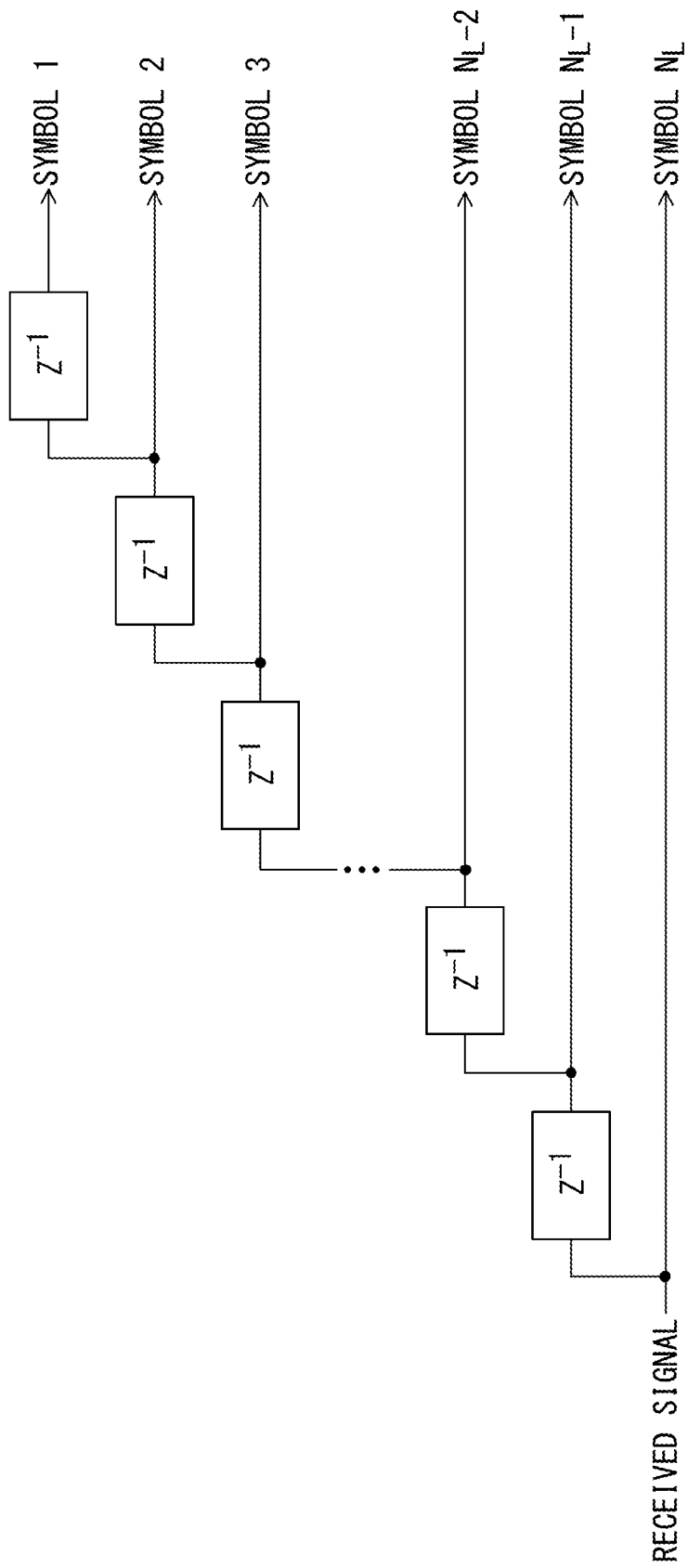
FIG. 9 illustrates an embodiment of a symbol delay circuit.

Successive $N_L$ received symbols are input in parallel to the frequency offset estimation circuit 10. The successive $N_L$ received symbols are obtained by a symbol delay circuit illustrated in FIG. 9. The symbol delay circuit includes N−1 delay elements Z. A delay time of each delay element Z is one symbol time. In the embodiment, symbol 1 is the oldest one while symbol $N_L$ is the newest one. Note that each symbol is expressed by the I-component and the Q-component.

The phase detector 11 detects a phase (or an argument) of symbol 1. Here, the phase of symbol 1 is used as a reference phase to detect a phase difference in the phase difference detector 14. Thus, symbol 1 is called a "reference symbol" in some cases. The phase of the reference symbol (i.e., symbol 1) is called $\theta_R$ in some cases.

Symbols 2 through $N_L$ are input to the selector 12. The selector 12 selects a corresponding symbol in accordance with a symbol selection signal given by the symbol interval controller 19. When the symbol interval controller 19 specifies the symbol interval Ni, the symbol selection signal indicates "Ni+1". Then, the selector 12 selects symbol "Ni+1". The symbol selected by the selector 12 is called the "selected symbol" in some cases.

The phase detector 13 detects a phase (or an argument) of the selected symbol selected by the selector 12. The phase of the selected symbol is called $\theta_S$ in some cases.

The phase difference detector 14 detects a difference between the phase $\theta_R$ of the reference symbol and the phase $\theta_S$. of the selected symbol. The phase difference detector 14, however, detects a phase difference between the reference symbol and the selected symbol due to the frequency offset. Here, when the symbol interval controller 19 specifies the symbol interval Ni, a phase difference between the reference symbol (i.e., symbol 1) and the symbol Ni+1 is detected. That is, a phase difference that is Ni times a phase difference between two successive symbols is detected. Note that the configuration and operation of the phase difference detector 14 will be explained later.

The divider 15 divides the phase difference detected by the phase difference detector 14 by Ni. Note that the divider 15 receives a notification indicating the symbol interval Ni from the symbol interval controller 19. The loop filter 16 averages calculation results by the divider 15. The calculation result by the loop filter 16 is output as a frequency offset estimate value.

The multiplier 17 multiplies the frequency offset estimation value by Ni. Note that the multiplier 17 receives a notification indicating the symbol interval Ni from the symbol interval controller 19. Further, the multiplied result is used in the phase difference detector 14, as will be explained later.

The threshold value determination unit 18 determines a threshold value in accordance with a modulation scheme of the received optical signal. The modulation scheme of the received optical signal is notified by a network administrator, for instance. The threshold value is $\pm\pi/4$ in the case where the modulation scheme of the received optical signal is QPSK. The symbol interval controller 19 specifies anew symbol interval based on the frequency offset estimation value, the threshold value given by the threshold value determination unit 18, and a current symbol interval Ni. That is, the symbol interval N is updated on a real time basis.

As described above, the phase difference detector 14 detects a phase difference between a phase of the reference symbol and a phase of the selected symbol. A phase of each symbol, however, is dependent on values of corresponding two bits allocated to the symbol. For example, $\pi/4$ is allocated to a symbol transmitting "11", and $3\pi/4$ is allocated to a symbol transmitting "01". Hence, the phase difference detector 14 has a function to compensate for a modulation phase corresponding to the transmitted data. Therefore, the phase difference detector 14 includes a phase converter 21, a subtractor 22, a phase converter 23, a subtractor 24, and an adder 25.

The phase converter 21 receives the phase $\theta_R$ of the reference symbol. Then, the phase converter 21 converts the phase $\theta_R$ into a phase $\theta_{R1}$. Note that $x=\theta_R$ is satisfied for the phase converter 21.

If $x<\pi/2$, then $\theta_{R1}=\theta_R-\pi/4$.
If $\pi/2\leq x<\pi$, then $\theta_{R1}=\theta_R-3\pi/4$.
If $\pi\leq x<3\pi/2$, then $\theta_{R1}=\theta_R-5\pi/4$.
If $3\pi/2\leq x<2\pi$, then $\theta_{R1}=\theta_R-7\pi/4$.

Thus, if the phase $\theta_R$ of the reference symbol is 45 degrees, $\theta_{R1}=0$ is obtained. In addition, if the phase $\theta_R$ of the reference symbol is 150 degrees, $\theta_{R1}=15$ is obtained.

The phase converter 23 receives the phase $\theta_S$ of the selected symbol selected detected by the phase detector 13. The subtractor 22 subtracts a calculation result made by the adder 25 from the phase $\theta_S$ of the selected symbol. Then, the calculation result y of the subtractor 22 is fed to the phase converter 23. The phase converter 23 converts the phase $\theta_S$ into a phase $\theta_{S1}$ in accordance with the following conditions.

If $y<\pi/2$, then $\theta_{S1}=\theta_S-\pi/4$.
If $\pi/2\leq y<\pi$, then $\theta_{S1}=\theta_S-3\pi/4$.
If $\pi\leq y<3\pi/2$, then $\theta_{S1}=\theta_S-5\pi/4$.
If $3\pi/2\leq y<2\pi$, then $\theta_{S1}=\theta_S-7\pi/4$.

The subtractor 24 calculates a difference between the phase $\theta_{R1}$ obtained by the phase converter 21 and the phase $\theta_{S1}$ obtained by the phase converter 23. This calculation result indicates a phase difference occurring between the reference symbol and the selected symbol due to the frequency offset. This phase difference is divided by Ni by the divider 15, and then averaged in the loop filter 16.

The adder 25 adds a calculation result of the multiplier 17 to the phase $\theta_{R1}$ obtained from the phase converter 21. The calculation result by the adder 25 is used by the subtractor 22 as described above.

Next, an operation example of the frequency offset estimation circuit of the embodiment will be explained. It is assumed here that the modulation scheme of the received optical signal is QPSK and that the threshold value given to the symbol interval controller 19 is $\pm\pi/4$. It is also assumed that the frequency offset occurring for one symbol time is "10 (degrees)", and that the loop filter 16 holds "10" as an average value of the phase differences. The average value corresponds to the frequency offset estimation value.

Figure 10:
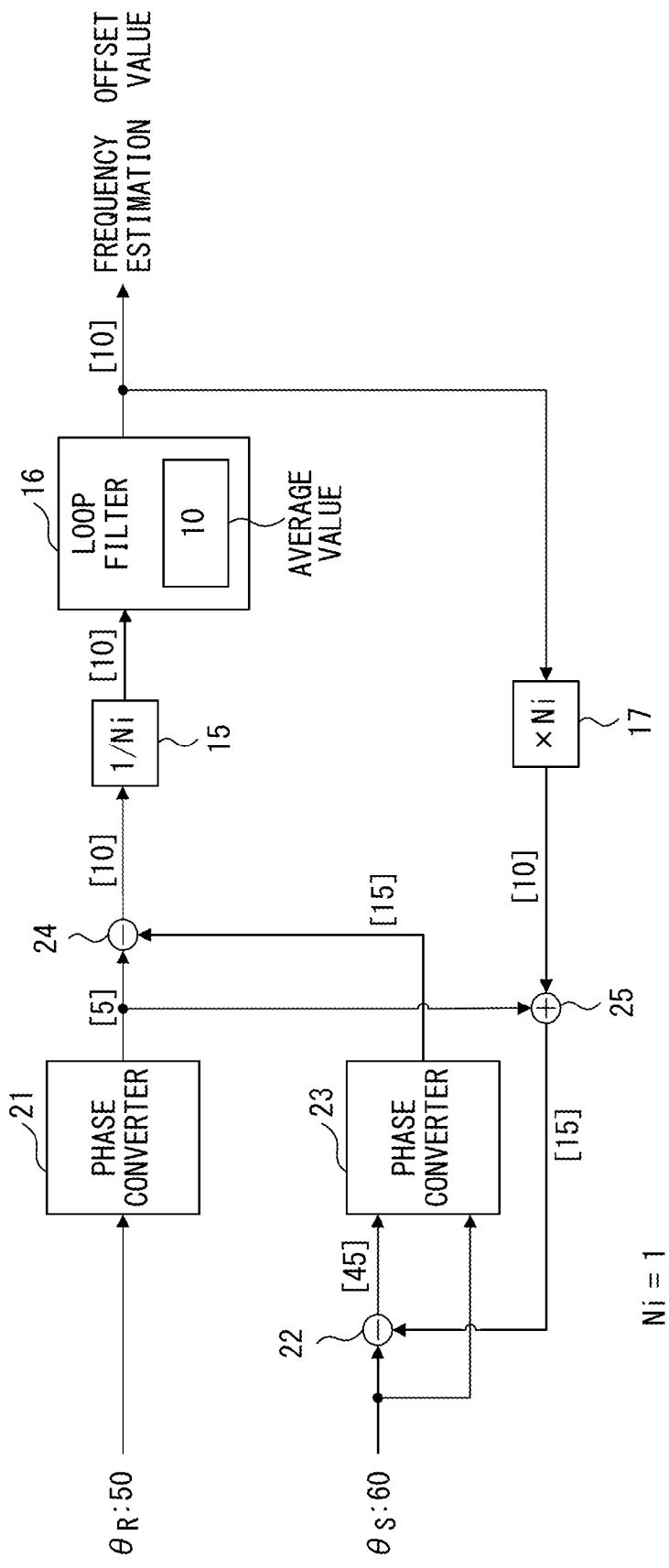
FIGS. 10-13 illustrate operation examples of a frequency offset estimation circuit.

In the example illustrated in FIG. 10, the symbol interval Ni=1 is specified by the symbol interval controller 19. Then, the phase $\theta_R=50$ is detected from the reference symbol and the phase $\theta_S=60$ is detected from the selected symbol.

The phase converter 21 selects a conversion formula in accordance with the variable x described above. In the phase converter 21, $x=\theta_R=50$ is satisfied. Thus, "$x<\pi/2$" is satisfied and the phase converter 21 calculates $\theta_{R1}=\theta_R-\pi/4$. That is, $\theta_{R1}=5$ is obtained.

The phase converter 23 selects a conversion formula in accordance with the variable y described above. The variable y is obtained by subtracting the calculation result of the adder 25 from the phase $\theta_S$. In this example, since the frequency offset estimation value is "10" and Ni=1, the output of the multiplier 17 is "10". Thus, the calculation result of the adder 25 is "15" and the calculation result of the adder 25 is subtracted from the phase $\theta_S=60$, so that y=45 is obtained. Thus, "$y<\pi/2$" is satisfied and the phase converter 23 calculates $\theta_{S1}=\theta_S-\pi/4$. That is, $\theta_{S1}=15$ is obtained.

In this case, the phase difference=10 is detected by the subtractor 24. Here, in the example illustrated in FIG. 10, the symbol interval Ni=1 has been specified. Thus, "10" is input to the loop filter 16. As a result, the frequency offset estimation value=10 is obtained.

In this way, in the example illustrated in FIG. 10, the frequency offset estimation value=10 is obtained. Further, since the modulation scheme of the received optical signal is QPSK, the threshold range is $\pm\pi/4$. In this case, the symbol interval Ni should be "4" for the "frequency offset estimation value×Ni" to be maximum in the threshold range. Thus, the symbol interval controller 19 can enlarge the symbol interval between two symbols used for the frequency offset estimation up to "4".

Figure 11:
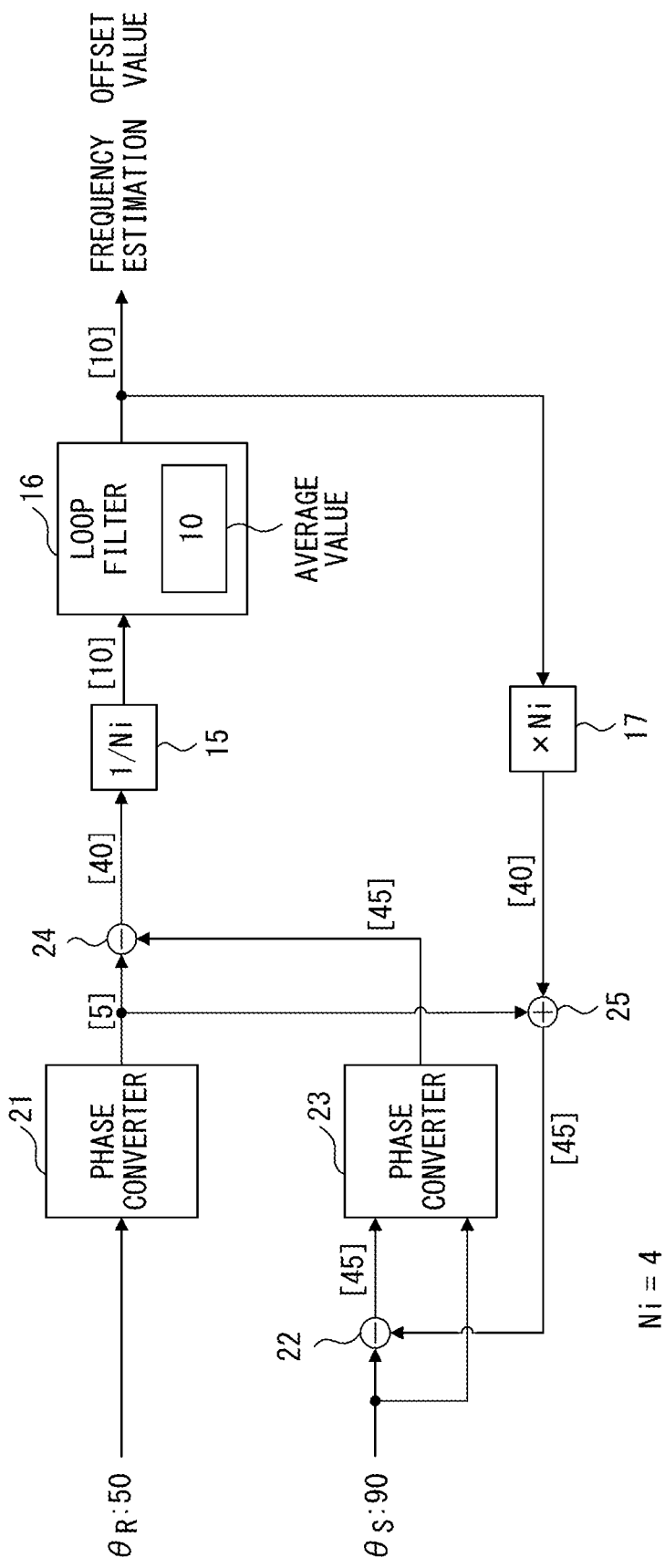

In an example illustrated in FIG. 11, the symbol interval Ni=4 is specified by the symbol interval controller 19. In addition, the phase $\theta_R=50$ is detected from the reference symbol and the phase $\theta_S=90$ is detected from the selected symbol.

The phase converter 21 outputs $\theta_{R1}=5$ similarly to the example illustrated in FIG. 10. Since the frequency offset estimation value is "10" and Ni=4, the output of the multiplier 17 is "40". Hence, the calculation result of the adder 25 is "45", and the calculation result of the adder 25 is subtracted from the phase $\theta_S$=90, so that y=45 is obtained. Then, similarly to the example illustrated in FIG. 10, "y<π/2" is satisfied and the phase converter 23 calculates $\theta_{S1}$=$\theta_S$−π/4. That is, $\theta_{S1}$=45 is obtained.

In this case, the phase difference=40 is detected by the subtractor 24. Here, in the example illustrated in FIG. 11, the symbol interval Ni=4 is specified. Thus, "10" is input to the loop filter 16. As a result, the frequency offset estimation value=10 is obtained.

In this way, as illustrated in FIGS. 10 and 11, according to the frequency offset estimation circuit of the embodiment, even if the intervals between the two symbols used for the frequency offset estimation are different, the same frequency offset estimation value is obtained. Here, when the symbol interval becomes larger, as described with reference to FIGS. 5 and 6, noise added to information indicating a phase difference between the two received symbols is suppressed. Thus, even if the coefficient of the loop filter is not large, the influence of noise added to the optical signal is sufficiently suppressed, and the estimation accuracy of the frequency offset is improved.

Figure 12:
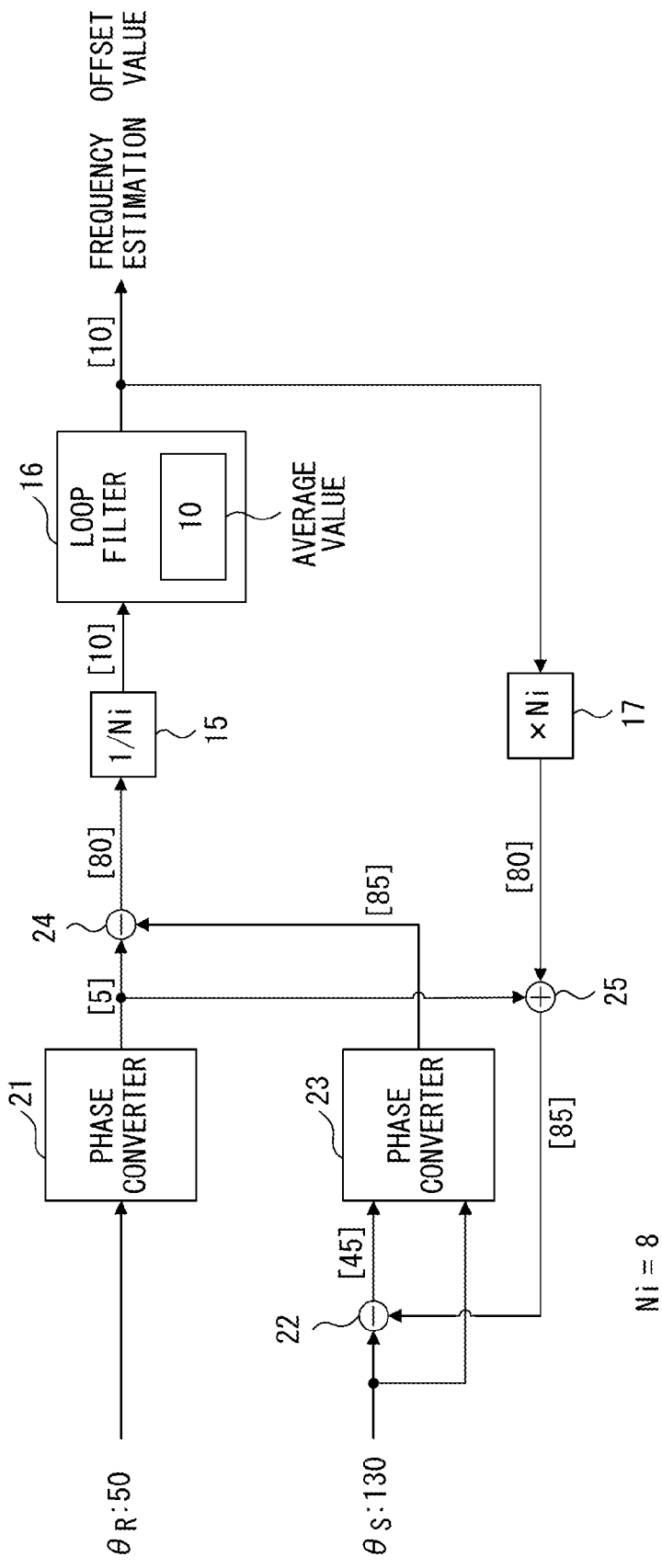

In an example illustrated in FIG. 12, the symbol interval Ni=8 is specified by the symbol interval controller 19. Then, the phase $\theta_R$=50 is detected from the reference symbol and the phase $\theta_S$=130 is detected from the selected symbol. In this case, the phase parameter used for the threshold decision in the symbol interval controller 19 is "80", which exceeds the threshold range (±π/4). Note that, as described above, the phase parameter is obtained in the multiplier 17 by multiplying the frequency offset estimation value by the symbol interval Ni.

The phase converter 21 outputs $\theta_{R1}$=5 similarly to the example illustrated in FIG. 10. Further, since the frequency offset estimation value is "10" and Ni=8, the output of the multiplier 17 is "80". Hence, the calculation result of the adder 25 is "85", and the calculation result of the adder 25 is subtracted from the phase $\theta_S$=130, so that y=45 is obtained. Then, similarly to the example illustrated in FIG. 10, "y<π/2" is satisfied and the phase converter 23 calculates $\theta_{S1}$=$\theta_S$−π/4. That is, $\theta_{S1}$=85 is obtained.

In this case, the phase=80 is detected by the subtractor 24. Here, in the example illustrated in FIG. 12, the symbol interval Ni=8 is specified. Thus, "10" is input to the loop filter 16. As a result, the frequency offset estimation value=10 is obtained.

In this way, when the average value held by the loop filter 16 is converged, a correct frequency offset may be obtained even if the phase parameter is not in the threshold range. When the average value held by the loop filter 16 is not converged, however, the frequency offset estimation circuit may not estimate a frequency offset correctly if the phase parameter exceeds the threshold range.

Figure 13:
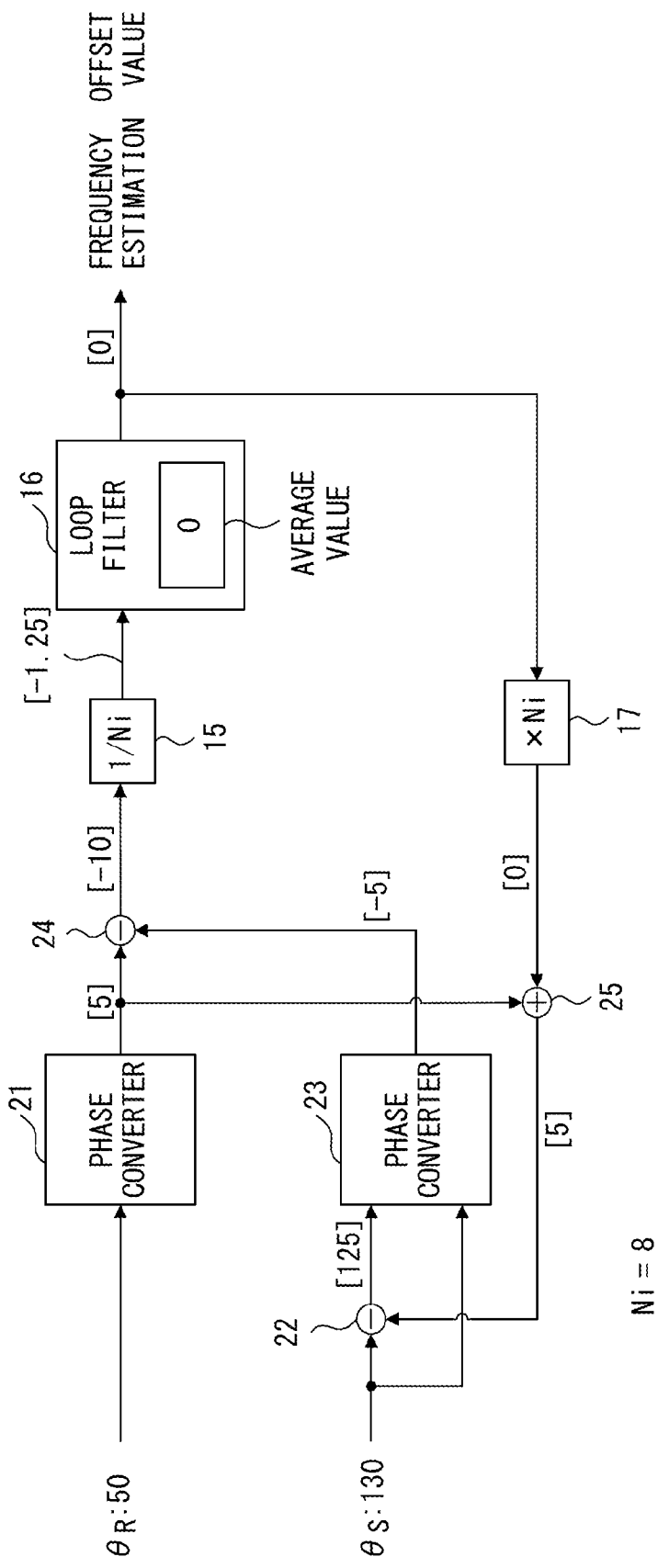

In the case illustrated in FIG. 13, similarly to the example illustrated in FIG. 12, the symbol interval Ni=8 is specified. Further, the phase $\theta_R$=50 is detected from the reference symbol and the phase $\theta_S$=130 is detected form the selected symbol. However, "0" is held in the loop filter 16. Note that, when the frequency offset estimation circuit initiates operations, for instance, "0" is provided to the loop filter 16 as the initial value.

As illustrated in FIG. 13, when "0" is held in the loop filter 16, the output of the multiplier 17 is "0", and the output of the adder 25 becomes "5". Thus, the output of the subtractor is "125". In this case, since "π/2≤y<π" is satisfied, the phase converter 23 calculates $\theta_{S1}$=$\theta_S$−3π/4. That is, the phase converter 23 outputs $\theta_{S1}$=−5. Then, the phase difference detected by the subtractor 24 is "−10". Here, in this example, the symbol interval Ni=8 is specified. Thus, "−1.25" is input to the loop filter 16. In this case, the frequency offset estimation circuit does not obtain the frequency offset estimation value=10.

FIGS. 14A and 14B are diagrams for explaining a problem in an operation example illustrated in FIG. 13. FIG. 14A illustrates the phase $\theta_R$ of the reference symbol and phase $\theta_S$ of the selected symbol. Further, FIG. 14B illustrates the phase $\theta_{R1}$ obtained by the phase converter 21 and phase $\theta_{S1}$ obtained by the phase converter 23.

Here, as illustrated in FIG. 12, when the average value held by the loop filter 16 is correctly converged, the phase converter 23 calculates $\theta_{S1}$=$\theta_S$−π/4. In this case, the phase $\theta_S$ is converted into $\theta'_S$ indicated by a broken line in FIG. 14B. In contrast, when the average value held by the loop filter 16 is not correctly converged, a different conversion is carried out by the phase converter 23 in some cases. For example, in the case illustrated in FIG. 13, the phase converter 23 calculates $\theta_{S1}$=$\theta_S$−3π/4. Then, the phase $\theta_S$ is converted into $\theta_{S1}$ illustrated in FIG. 14B. In this case, a wrong phase is detected, and the frequency offset is not estimated correctly.

This problem is caused by a situation where the interval between two symbols used for the frequency offset estimation is excessively large. Thus, in the method of estimating a frequency offset in the embodiment, the maximum value of the symbol interval is limited so that the phase parameter, which is calculated from the frequency offset estimation value and the symbol interval Ni, does not exceed the threshold range. This threshold is determined so that the average value held by the loop filter 16 converges in an actual frequency offset in accordance with a modulation scheme of the received optical signal. By way of example, when the optical receiver receives QPSK modulated optical signal, the threshold range is ±π/4. Note that the threshold may be determined by measurement, simulation, or the like so that the average value held by the loop filter 16 converges in an actual frequency offset.

Figure 15:
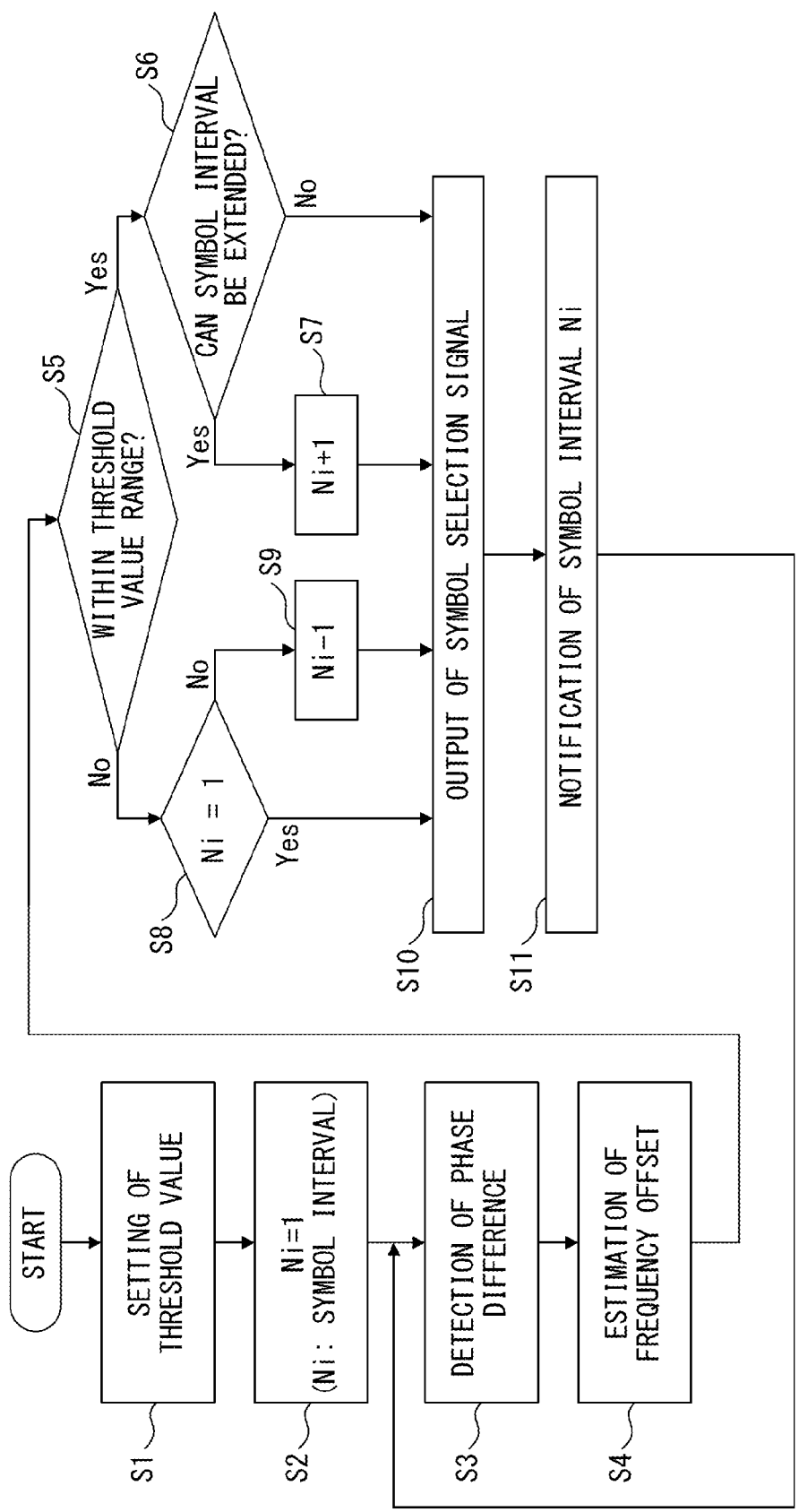
FIG. 15 is a flowchart illustrating a frequency offset estimation method.

FIG. 15 is a flowchart illustrating a method of estimating a frequency offset in accordance with the embodiment. Processing operations of this flowchart are carried out by a digital signal processor (the digital signal processor 207 in the example illustrated in FIG. 2). This digital signal processor may be implemented by a processor system including a processor and a memory. Further, this digital signal processor may be implemented by a combination of software and hardware. Note that operations S1-S2 and S5-S11 are carried out by the symbol interval controller 7 illustrated in FIG. 7 or the symbol interval controller 19 illustrated in FIG. 8. In the following explanation, operations in the frequency offset estimation circuit illustrated in FIG. 8 will be made.

In S1, the symbol interval controller 19 sets the threshold value to limit the maximum value of the symbol interval. This threshold value is determined by the threshold value determination unit 18 and is provided to the symbol interval controller 19. Note that the threshold value is determined in accordance with the modulation scheme of the received optical signal.

In S2, the symbol interval controller 19 initializes the symbol interval Ni. In this example, the initial value of the symbol interval Ni is "1". Then, the symbol interval controller 19 generates the symbol selection signal that indicates the symbol interval Ni and provides the signal to the selector 12. Thus, the selector 12 selects the symbol Ni+1. Here, since Ni=1, the selector 12 selects the symbol 2. Hence, in this case, the phase difference detector 14 detects a phase difference between two successive received symbols. Further, the symbol interval controller 19 notifies the divider 15 and the multiplier 17 of the symbol interval Ni.

In S3, the phase detectors 11 and 13 and the phase difference detector 14 detect a difference between a phase of the reference symbol and a phase of the selected symbol selected by the selector 12. Note that the phase difference detector 14 detects a phase difference between the two successive received symbols due to the frequency offset. In S4, the divider 15 and the loop filter 16 estimate the frequency offset based on the phase difference detected by the phase difference detector 14. Note that, in this embodiment, the frequency offset is expressed by the phase difference occurring for one symbol time.

In S5, the symbol interval controller 19 carries out the threshold decision with respect to the frequency offset estimate value and the present symbol interval Ni. In this threshold decision, the threshold value set up in S1 is compared with the value (i.e., the phase parameter) obtained by multiplying the frequency offset estimation value by the present symbol interval Ni.

When the phase parameter is in the threshold range, the symbol interval controller 19 determines whether or not the symbol interval can be extended in the S6. At this time, the symbol interval controller 19 compares the threshold value described above with the value obtained by multiplying the frequency offset estimation value by Ni+1 (hereinafter called the extended phase parameter). If the extended phase parameter is in the threshold range, the symbol interval controller 19 updates the symbol interval from Ni to Ni+1 in S7. On the other hand, if the extended phase parameter is not in the threshold range, the symbol interval controller 19 skips the processing operation of S7.

When the phase parameter exceeds the threshold range, the symbol interval controller 19 determines whether the current symbol interval Ni is "1" in S8. When the current symbol interval Ni is larger than or equal to 2, the symbol interval controller 19 updates the symbol interval from Ni to Ni−1 in S9. On the other hand, when the current symbol interval Ni is "1", the symbol interval controller 19 skips the processing operation of S9. Note that, when the phase parameter exceeds the threshold range and the current symbol interval Ni is "1", the frequency offset estimation circuit may not estimate the frequency offset correctively. Hence, in this case, the frequency offset estimation circuit may output an error message.

In S10, the symbol interval controller 19 generates a symbol selection signal based on the latest symbol interval Ni obtained from S5 through S9. Note that, when receiving this symbol selection signal, the selector 12 selects the symbol Ni+1. In S11, the symbol interval controller 19 notifies the divider 15 and the multiplier 17 of the latest symbol interval Ni obtained from S5 through S9. Then, the divider 15 divides the phase difference detected by the phase difference detector 14 by Ni. Further, the multiplier 17 multiplies the frequency offset estimation value by Ni.

By repeatedly executing the above-described S3 through S11, the symbol interval Ni increases from the initial value. The symbol interval controller 19 then determines the symbol interval Ni that will maximize the phase parameter within the threshold range. Accordingly, the influence due to noise components added to the optical signal can be suppressed without lowering the performance of the loop filter 16.

FIGS. 16A-16C illustrate simulation results with respect to symbol intervals and estimation errors. In FIGS. 16A-16C, the vertical axis represents an error of frequency offset estimation value with respect to actual frequency offset. It is assumed that the frequency offset estimation value is obtained by the frequency offset estimation circuit illustrated in FIG. 8.

FIG. 16A indicates an error when the symbol interval (the interval between two symbols used for the estimation of a frequency offset) is "1". In FIG. 16B, the symbol interval is extended from "1" to "2" at time T1. In FIG. 16C, the symbol interval is extended from "1" to "2" at time T1 and then the symbol interval is extended from "2" to "4" at time T2. It is evident from FIGS. 16A and 16B that estimation errors become smaller as the symbol interval is extended from "1" to "2". In addition, it is also evident from FIGS. 16B and 16C that estimation errors become further smaller as the symbol interval is extended from "2" to "4".

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A frequency offset estimation circuit that estimates a frequency offset indicating a difference between a carrier frequency of a received optical signal and a frequency of a local oscillation light used to recover a transmission signal from the received optical signal, the frequency offset estimation circuit comprising:
   a phase detector configured to sequentially detect a phase of each received symbol and generate a phase signal representing the detected phase;
   a variable delay element configured to delay the phase signal generated by the phase detector;
   a phase difference detector configured to detect a phase difference due to the frequency offset between a first symbol and a second symbol that is transmitted after the first symbol by a specified symbol interval based on a first phase signal representing a phase of the first symbol and a second phase signal representing a phase of the second symbol, the first phase signal being fed from the phase detector to the phase difference detector and the second phase signal being fed from the variable delay element to the phase difference detector;
   an estimator configured to estimate the frequency offset based on the phase difference detected by the phase difference detector; and
   a symbol interval controller configured to specify the symbol interval based on the frequency offset estimated by the estimator and control the variable delay element such that a delay amount of the variable delay element being equal to the specified symbol interval.

2. The frequency offset estimation circuit according to claim 1, wherein the estimator includes:
   a divider configured to divide the phase difference detected by the phase detector by the specified symbol interval, and
   a loop filter configured to average results of the divider and output a frequency offset estimation value.

3. A frequency offset estimation circuit that estimates a frequency offset indicating a difference between a carrier frequency of a received optical signal and a frequency of a local oscillation light used to recover a transmission signal from the received optical signal, the frequency offset estimation circuit comprising:
- a phase difference detector configured to detect a phase difference due to the frequency offset between a first symbol and a second symbol that is transmitted after the first symbol by a specified symbol interval based on a phase of the first symbol and a phase of the second symbol;
- an estimator configured to estimate the frequency offset based on the phase difference detected by the phase difference detector; and
- a symbol interval controller configured to specify the symbol interval based on the frequency offset estimated by the estimator, wherein
- the symbol interval controller specifies the symbol interval so as to maximize a phase parameter calculated from the frequency offset and the symbol interval within a threshold range determined in accordance with a modulation scheme of the received optical signal.

4. The frequency offset estimation circuit according to claim 3, wherein the phase parameter is calculated by multiplying the frequency offset by the symbol interval.

5. The frequency offset estimation circuit according to claim 3, wherein the symbol interval controller increments a current symbol interval by one symbol when the phase parameter is within the threshold range and when the phase parameter obtained by incrementing the current symbol interval by one symbol is expected to be within the threshold range.

6. The frequency offset estimation circuit according to claim 5, wherein the symbol interval controller decrements the current symbol interval by one symbol when the phase parameter is out of the threshold range.

7. An optical receiver comprising:
- a receiver circuit configured to receive an optical signal by using local oscillation light;
- a frequency offset estimation circuit configured to estimate a frequency offset that indicates a difference between a carrier frequency of the optical signal and a frequency of the local oscillation light; and
- data recovery configured to recover data from the optical signal by using the frequency offset estimated by the frequency offset estimation circuit, wherein the frequency offset estimation circuit includes:
- a phase detector configured to sequentially detect a phase of each received symbol and generate a phase signal representing the detected phase;
- a variable delay element configured to delay the phase signal generated by the phase detector;
- a phase difference detector configured to detect a phase difference due to the frequency offset between a first symbol and a second symbol that is transmitted after the first symbol by a specified symbol interval based on a first phase signal representing a phase of the first symbol and a second phase signal representing a phase of the second symbol, the first phase signal being fed from the phase detector to the phase difference detector and the second phase signal being fed from the variable delay element to the phase difference detector;
- an estimator configured to estimate the frequency offset based on the phase difference detected by the phase difference detector; and
- a symbol interval controller configured to specify the symbol interval based on the frequency offset estimated by the estimator and control the variable delay element such that a delay amount of the variable delay element being equal to the specified symbol interval.

8. A frequency offset estimation method that estimates a frequency offset indicating a difference between a carrier frequency of a received optical signal and a frequency of a local oscillation light used to recover a transmission signal from the received optical signal, the method comprising:
- detecting a phase difference due to the frequency offset between a first symbol and a second symbol that is transmitted after the first symbol by a specified symbol interval based on a phase of the first symbol and a phase of the second symbol;
- estimating the frequency offset based on the detected phase difference; and
- specifying the symbol interval based on the estimated frequency offset so as to maximize a phase parameter calculated from the frequency offset and the symbol interval within a threshold range determined in accordance with a modulation scheme of the received optical signal.

* * * * *